(12) United States Patent
Amend et al.

(10) Patent No.: US 12,483,973 B2
(45) Date of Patent: Nov. 25, 2025

(54) METHOD AND SYSTEM FOR REACHABILITY OF SERVICES SPECIFIC TO ONE SPECIFIC NETWORK ACCESS OVER A DIFFERENT NETWORK ACCESS AND SYSTEM THEREOF

(71) Applicant: DEUTSCHE TELEKOM AG, Bonn (DE)

(72) Inventors: Markus Amend, Nidda (DE); Eckard Bogenfeld, Carlsberg (DE)

(73) Assignee: DEUTSCHE TELEKOM AG, Bonn (DE)

( * ) Notice: Subject to any disclaimer, the term of this patent is extended or adjusted under 35 U.S.C. 154(b) by 330 days.

(21) Appl. No.: 18/253,041

(22) PCT Filed: Sep. 21, 2021

(86) PCT No.: PCT/EP2021/075867
§ 371 (c)(1),
(2) Date: May 16, 2023

(87) PCT Pub. No.: WO2022/106094
PCT Pub. Date: May 27, 2022

(65) Prior Publication Data
US 2023/0422153 A1     Dec. 28, 2023

(30) Foreign Application Priority Data

Nov. 18, 2020   (EP) ................... 20208409

(51) Int. Cl.
*H04W 48/14* (2009.01)
*H04W 12/06* (2021.01)
*H04W 40/02* (2009.01)

(52) U.S. Cl.
CPC ........... *H04W 48/14* (2013.01); *H04W 12/06* (2013.01); *H04W 40/02* (2013.01)

(58) Field of Classification Search
CPC ..... H04W 48/14; H04W 12/06; H04W 40/02; H04L 41/08
See application file for complete search history.

(56) References Cited

U.S. PATENT DOCUMENTS 11,844,129 B2 *   12/2023   Amend ................ H04W 76/12
12,021,923 B2 *   6/2024    Jung ..................... H04L 69/08
(Continued)

FOREIGN PATENT DOCUMENTS

EP   3328106 A1   5/2018

OTHER PUBLICATIONS

Broadband Forum: "TR-459 Control and User Plane Separation for a disaggregated Bng", 3GPP Draft; C4-203064, 3rd Generation Partnership Project (3GPP), Mobile Competence Centre; 650, Route Des Lucioles; F-06921 Sophia-Antipolis Cedex; France, no. DEFAULT_VALUE; Apr. 1, 2020, May 14, 2020 (May 14, 2020), XP051882750, Retrieved from the Internet: URL:https://ftp.3gpp.org/tsg_ct/WG4_protocollars_ex-CN4/TSGCT4_98e_meeting/Docs/C4-203064.zipLIAISE-365-WT-459.Rev01.final_ballot-00.pdf [retrieved on May 14, 2020].

*Primary Examiner* — George Eng
(74) *Attorney, Agent, or Firm* — Leydig, Voit & Mayer, Ltd.

(57) ABSTRACT

A system includes a user equipment (UE), a multi-connectivity (MC) termination point, and a service provider. The UE is connectable to the MC termination point through a first MC path and a second MC path. The first MC path comprises a first access network and the second MC path comprises a second access network. The MC termination point is configured to send, to the service provider, access specific information on behalf of the UE and/or the first MC (Continued)

path. The service provider is configured to send, to the MC termination point, service information associated with the first access network.

23 Claims, 4 Drawing Sheets

(56) References Cited

U.S. PATENT DOCUMENTS

| | | | |
|---|---|---|---|
| 12,052,606 B2* | 7/2024 | Salkintzis | H04W 76/15 |
| 12,075,283 B2* | 8/2024 | Kim | H04W 28/10 |
| 2014/0289826 A1 | 9/2014 | Croome | |
| 2016/0183166 A1* | 6/2016 | Chen | H04W 48/02 |
| | | | 455/435.1 |
| 2016/0262021 A1 | 9/2016 | Lee et al. | |

* cited by examiner

METHOD AND SYSTEM FOR REACHABILITY OF SERVICES SPECIFIC TO ONE SPECIFIC NETWORK ACCESS OVER A DIFFERENT NETWORK ACCESS AND SYSTEM THEREOF

CROSS-REFERENCE TO PRIOR APPLICATIONS

This application is a U.S. National Phase application under 35 U.S.C. § 371 of International Application No. PCT/EP2021/075867, filed on Sep. 21, 2021, and claims benefit to European Patent Application No. EP 20 20 8409.1, filed Nov. 18, 2020. The International Application was published in English on May 27, 2022 as WO 2022/106094 A1 under PCT Article 21(2).

FIELD OF THE INVENTION

This invention relates to a method and system of reachability of services specific to one network access over other access paths all belonging to an overarching multi-connectivity network and a system thereof.

BACKGROUND

Typically, Internet network operators provide one or several Internet accesses to customers such as, for example, fixed (e.g. xDSL), Wi-Fi (e.g. public Hotspots) and/or cellular (e.g. 2G-5G) access. In the case of smartphones, the common simultaneous connectivity to Wi-Fi and cellular networks does not automatically mean that the smartphones can enjoy the benefit of being simultaneously connected to more than one network. In some cases, applications of these smartphones are stuck to one access and are unable to benefit from a second available access in terms of reliability and speed. Network protocols which could leverage the potential of multiple accesses like Multipath Transmission Protocol (MPTCP), Multipath Quick UDP Internet Connection (MP-QUIC), Multipath Datagram Congestion Control Protocol (MP-DCCP) and Stream Control Transmission Protocol (SCTP) are not widely adopted and require usually an end-to-end implementation. A broad and fast availability is therefore unrealistic.

Multi-connectivity networks provided by 3GPP ATSSS, described in [1]: 3*GPP Technical Specification: 23.501, Version* 16.3.0, 22 *Dec.* 2019, or Hybrid Access, described in [2]: Nicolai Leymann and Cornelius Heidemann and Margaret Wasserman and Li Xue and Mingui Zhang, "*Hybrid Access Network Architecture*", *draft-lhwxz-hybrid-access-network-architecture-*02, *January* 2015, and in [3]: *BBR Specification TR*-348, *July* 2016, combine multiple access paths for higher reliability and potentially higher capacities.

Such standardized multi-connectivity architectures promise to provide a remedy and use such protocols between UE/RG and access operator network. Furthermore, these architectures give the operator of such architectures a comprehensive traffic management capability.

Typically, in [1] or [2], cellular and Wi-Fi or cellular and fixed (xDSL, FTTx, cable) access are combined. Also, less integrated multi-connectivity networks like partial integration of the ATSSS or ATSSS overlay can be applied. These less integrated multi-connectivity networks are characterized by at least multipath support, with a new backend entity resembling on backend side the ATSSS UPF, while not requiring the same integration level. In particular that means that the backend component can also be located at a Mobile virtual network operator (MVNO), a multi-connectivity provider with or without own access resources, at a mobile network operator (MNO) with EPC, at a MNO without the coupling with fundamentals core components as e.g. SMF, AMF, PCF, at a fixed network operator (FNO), or in a public cloud environment.

Optionally, the above-mentioned new backend entity is compared to the ATSSS UPF a lightweight implementation with only some of the functionalities or different functionalities. Multipath protocols supported might be similar to ATSSS UPF MPTCP, but maybe also MP-DCCP, MP-QUIC, QUIC, SCTP.

In all scenarios [1] to [3] or partial integration of the ATSSS or ATSSS overlay, it is not required that all accesses are owned by the multi-connectivity provider.

Services which are accessible over one access path, (for example, like Deutsche Telekom's pass.telekom.de, Magenta TV, etc.) are not reachable over the applied multi-connectivity network and most of all not over other accesses belonging to the multi-connectivity network.

FIG. 1 illustrates a cellular provided service according to the prior art. In FIG. 1, a User Equipment 1, UE, is connected to a service (cellular) 4 through a Radio Access Network 2, RAN, and a mobile core 3. The service (cellular) provider 4 may be part of the mobile core 3. Further, the mobile core 3 is assumed to hold relevant authentication information.

In FIG. 1, the UE 1 sends a request, in step S1, for cellular service information such as, for example, tariff-based information, to the service provider 4. The cellular service information is typically only accessible through cellular network or, in other words, a meaningful answer/output may only be obtained if it is requested through a cellular network. In the foregoing description the term "access specific information" will be used to refer to information which is associated with a particular network.

In step S2, the mobile core 3 adds authentication information. The authentication information may be, for example, a Mobile Station International Subscriber Directory Number (MSISDN).

The stickiness of services to individual accesses most often belongs to access specific (authentication) features which either get lost in case of multi-connectivity or are not available on other accesses.

Following the example of FIG. 1, a service may only be usable over a cellular network, due to the required Mobile Station International Subscriber Directory Number (MSISDN) information to adapt tariff individual settings (FIG. 1).

In an exemplary ATSSS scenario, requesting the service over: a) cellular network, is not possible because the traffic is redirected through the ATSSS UPF. In that case, the ATSSS UPF requests the information on behalf of the UE and the cellular network access specific information gets lost; or b) Wi-Fi, is not possible because of a), but moreover the required cellular access specific information is not available at all.

SUMMARY

In an exemplary embodiment, the present invention provides a system including a user equipment (UE), a multi-connectivity (MC) termination point, and a service provider. The UE is connectable to the MC termination point through a first MC path and a second MC path. The first MC path comprises a first access network and the second MC path comprises a second access network. The MC termination point is configured to send, to the service provider, access specific information on behalf of the UE and/or the first MC path. The service provider is configured to send, to the MC termination point, service information associated with the first access network.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
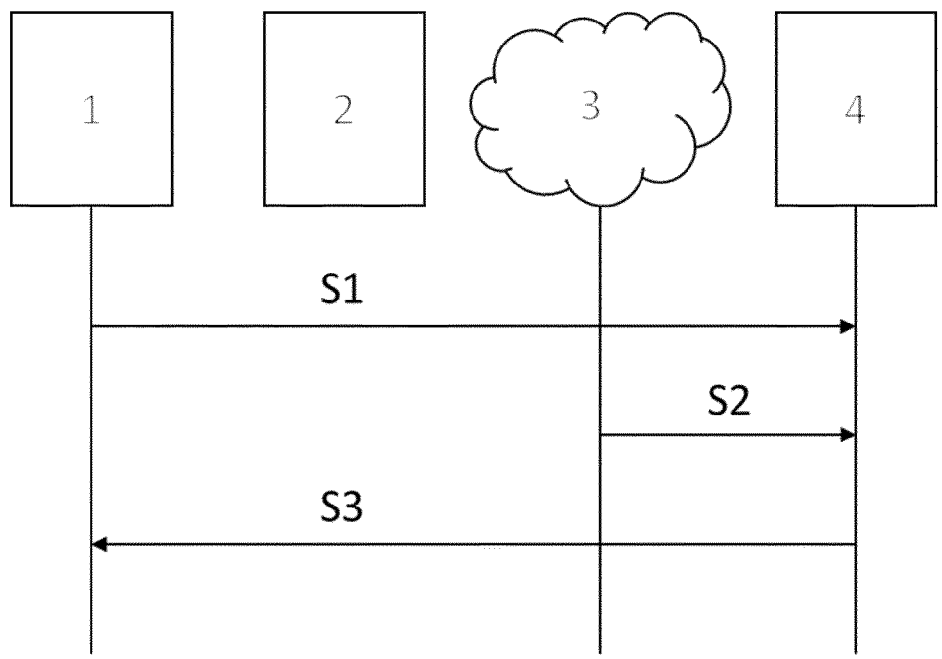
FIG. 1 illustrates a cellular network provided service according to the prior art.

Exemplary embodiments of the present invention overcome the limitations discussed above in the Background and provide a system and method for offering usage of access specific services over multi-connectivity networks while providing the expected access specific information.

According to an aspect of the invention, there is provided a system comprising a User Equipment (UE), a multi-connectivity (MC) termination point, and a service provider, wherein the UE is connectable to the multi-connectivity (MC) termination point through a first MC path and a second MC path, wherein the first path comprises a first access network and the second path comprises a second access network, wherein: the MC termination point is configured to send, to the service provider, access specific information on behalf of the UE and/or the first MC path; the service provider is configured to send, to the MC termination point, service information associated with the first access network.

According to a preferred aspect, the first access network comprises a Radio Access Network (RAN) and a mobile core, and the second access network comprises a Wi-Fi access point (AP) and a fixed core, wherein when the MC termination point does not have the access specific information, the MC termination point is further configured to: request for access specific information to the UE or the fixed core; and receive the requested authentication information from the UE or the fixed core.

According to a preferred aspect, the access specific information comprises authentication information and/or tariff-based information.

According to a preferred aspect, when the UE is connected to the MC termination point only through the second MC path: the UE is configured to request service information over the second MC path and the MC termination point from the service provider; the MC termination point is configured to send access specific information to the service provider on behalf of the UE; and the service provider is configured to send the requested service information to the UE through the MC termination point and the second MC path.

According to a preferred aspect, the UE or the first access network is configured to inform the service provider that the MC termination point is allowed to request from the service provider service information on behalf of the UE, or the UE or the first access network is configured to instruct the service provider to redirect the response to the UE through the MC termination point.

According to a preferred aspect, the MC termination point is an Access Traffic Steering, Switching and Splitting User Plane Function (ATSSS UPF), and/or wherein the access specific information comprises: Mobile Station International Subscriber Directory Number (MSISDN) and/or International Mobile Subscriber Identity (IMSI).

According to a preferred aspect, the MC termination point is configured to imitate a characteristic of the first access network, and/or wherein the MC termination point is configured to maintain a list of services which require access specific information, wherein, preferably, the list of services comprises: expected access information, type of information, and/or a method for exposing authentication information.

According to a preferred aspect, the UE or the first access network is configured to inform the service provider that the second access network is an eligible access for providing access specific information on behalf of the UE; the service provider is configured to send a message to the UE over the first access network, the message comprising authentication information to be used by the second access network; the UE is configured to send a request message to the service provider, through the second access network, requesting service information, wherein the request message comprises the received authentication information from the service provider; and the service provider is configured to send a message to the UE comprising the requested service information.

According to a preferred aspect, the UE or the first access network is configured to instruct the service provider to redirect all future communications through the multi-connectivity termination point.

According to another aspect of the invention, there is provided a method for reachability of services specific to a specific access network in a system, the system comprising a User Equipment (UE), a multi-connectivity (MC) termination point, and a service provider, wherein the UE is connectable to the multi-connectivity (MC) termination point through a first MC path and a second MC path, wherein the first path comprises a first access network and the second path comprises a second access network, the method comprising: sending, by the MC termination point to the service provider, access specific information on behalf of the UE and/or the first MC path; and sending, by the service provider to the MC termination point, service information associated with the first access network.

According to a preferred aspect, the first access network comprises a Radio Access Network (RAN) and a mobile core, and the second access network comprises Wi-Fi access point (AP) and a fixed core, wherein when the MC termination point does not have the access specific information, the method further comprises: requesting, by the MC termination point, access specific information from the UE or the fixed core; and receiving, by the MC termination point, the requested authentication information from the UE or the fixed core.

According to a preferred aspect, the access specific information comprises authentication information and/or tariff-based information.

According to a preferred aspect, the method further comprises: informing, by the UE or the first access network to the service provider, that the MC termination point is allowed to request from the service provider service information on behalf of the UE, or instructing, by the UE or the first access network to the service provider, to redirect the response to the UE through the MC termination point.

According to a preferred aspect, the MC termination point is an Access Traffic Steering, Switching and Splitting User Plane Function (ATSSS UPF), and/or wherein the access specific information comprises: Mobile Station International Subscriber Directory Number, MSISDN, and/or International Mobile Subscriber Identity (IMSI).

According to a preferred aspect, the method further comprises: imitating, by the MC termination point, a characteristic of the first access network, and/or maintaining, by the MC termination point, a list of services which require access specific information, wherein, preferably, the list of services comprises: expected access information, type of information, and/or a method for exposing authentication information.

According to a preferred aspect, the method further comprises: informing, by the UE or the first access network to the service provider, that the second access network is an eligible access for providing access specific information on behalf of the UE; sending, by the service provider to the UE, over the first access network, a message comprising authentication information to be used by the second access network; sending, by the UE to the service provider, through the second access network, a request message requesting service information, wherein the request message comprises the received authentication information from the service provider; and sending, by the service provider to the UE, a message comprising the requested service information.

According to a preferred aspect, the method further comprises: instructing, by the UE or the first access network to the service provider, to redirect all future communications through the MC termination point.

Other aspects, features, and advantages will be apparent from the summary above, as well as from the description that follows, including the figures and the claims.

The following description and figures assume a User Equipment 1 (UE) such as, for example, a smartphone, or Residential Gateway (RG), equipped with Wi-Fi and cellular access interfaces or fixed, such as DSL, and cellular access interfaces. However, this can be transferred to any other multi-connectivity scenario with more or other accesses.

According to an embodiment of the invention, there is provided a method and system configured to offer usage of access specific services over multi-connectivity networks while providing expected access specific information.

The system according to this embodiment requires at least that the particular access and the expected access specific information by the service are part of the used multi-connectivity network and the actual used access as well.

In that case, the multi-connectivity termination point, for example the ATSSS UPF, is configured to share the access specific information required by the service on behalf of the usual UE 1 based authentication (first case), or the requested service is informed that the multi-connectivity termination point is allowed to access the service on behalf of the UE 1 based authentication (second case). In the second case, this could be done, for example, over the 5G policy framework, REST APIs, or any suitable mechanism as long as the requested service is informed about the allowability to access the service on behalf of the UE 1 based authentication.

Figure 2:
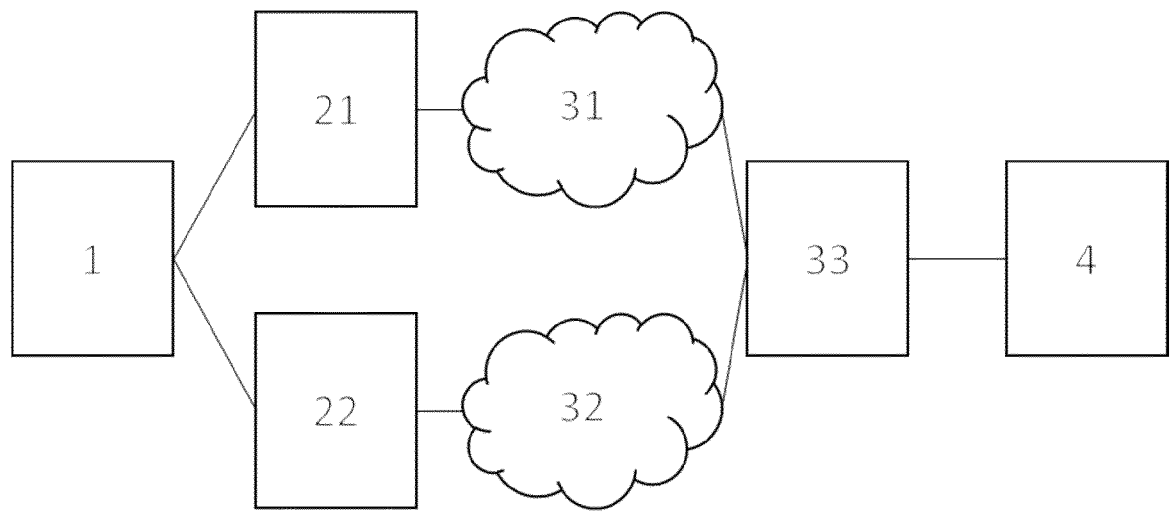
FIG. 2 illustrates a cellular service requested over Wi-Fi according to an embodiment of the present invention.
Figure 2:
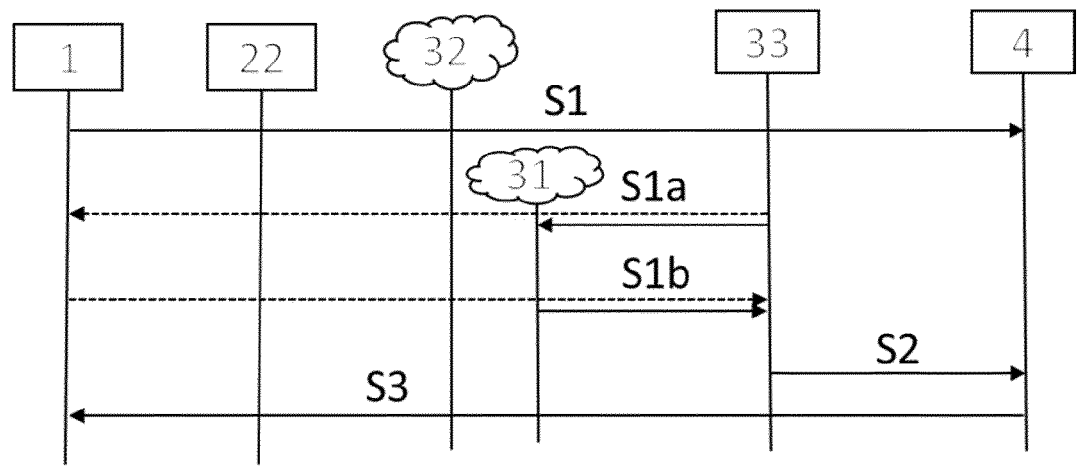

FIG. 2 illustrates the first case, where the multi-connectivity termination point 33 is configured to share the access information required by the service on behalf of the UE 1 based authentication. In FIG. 2, a UE 1 is connectable to one end of the multi-connectivity termination 33 point through two different paths. The first path is through the RAN 21 and the mobile core 31, and the second path is through a Wi-Fi access point 22 and a fixed core 32. The multi-connectivity termination point 33 is connected to the service provider 4 on the other end.

In FIG. 2, the multi-connectivity termination point 33 is configured to provide the access specific information to the service, e.g. a MSISDN or IMSI, and uses (suitable) traditional authentication schemes thereof.

FIG. 2 also illustrates a process when the multi-connectivity termination point 33 provides authentication information on behalf of the UE 1, while the UE 1 itself is connected over the Wi-Fi multipath 22, 32 but not over the cellular multipath 21, 31. Data is transmitted end-to-end.

For example, in the above scenario, assuming that the service provider grants access based on a cellular IP range, both the Wi-Fi network and a multi-connectivity termination point do not belong to this IP range. Then, there is a need that the UE or the cellular core have to inform the service, that the multi-connectivity termination point or Wi-Fi with a different IP address/range as usual, are allowed to request information on behalf the UE.

In step S1, the UE 1 requests cellular service information over Wi-Fi from the service provider 4. At this point, if the multi-connectivity termination point 33 is in charge of the relevant authentication information beforehand, step S1a and S1b are not performed. Alternatively, if the multi-connectivity termination point 33 is not in charge of the relevant authentication information beforehand, in step S1a, the multi-connectivity termination point 33 requests authentication information from the UE 1 or the mobile core 31. In step S1b the mobile core 31 or the UE 1 sends a response with the authentication information to multi-connectivity termination point 33.

In step S2, the multi-connectivity termination point 33 sends the authentication information to the service provider 4 on behalf of the UE 1.

In step S3, the service provider 4 sends the requested cellular service information to UE 1.

Figure 3:
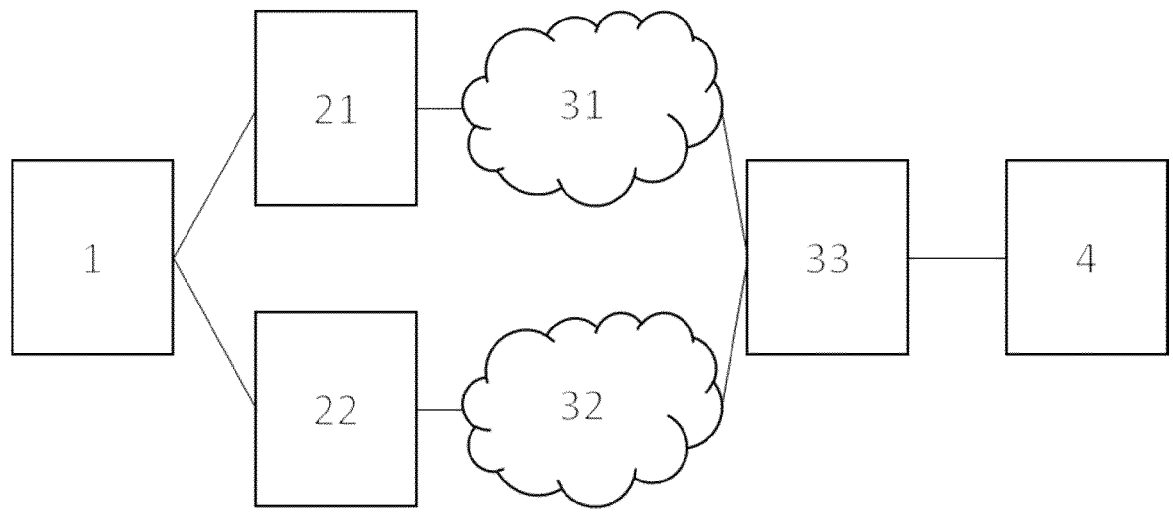
FIG. 3 illustrates a cellular service requested over Wi-Fi, where the mobile core intercepts and requests on behalf of the UE according to an embodiment of the present invention.
Figure 3:
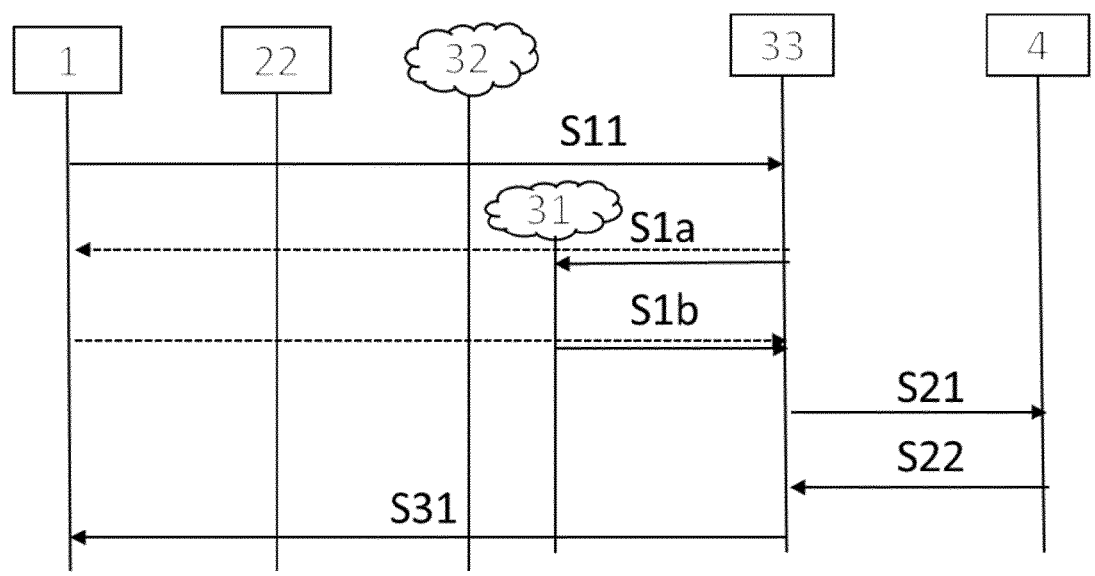
Figure 4:
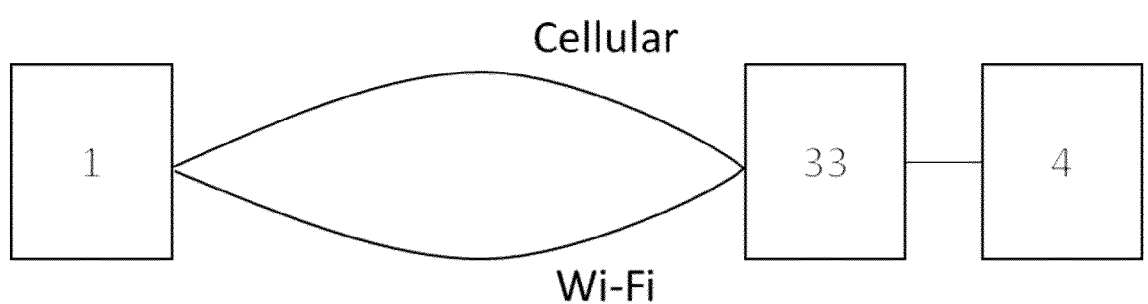
FIG. 4 illustrates an extended access eligibility requested over authorized access.
Figure 4:
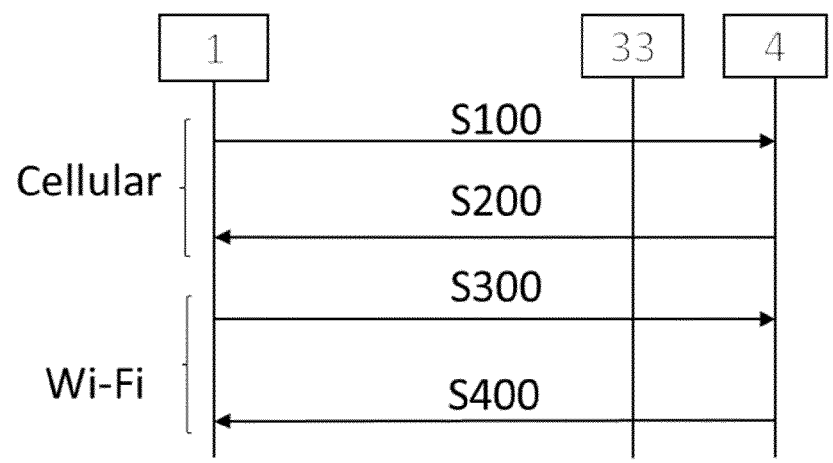

FIGS. 3 and 4 illustrate the second case. In FIG. 3 the same elements as for FIG. 2 are illustrated. However, the case of FIG. 3 differs from the one of FIG. 2 in that the multi-connectivity termination point 33 intercepts the cellular service information request from the cellular service provider 4 and requests, on behalf of the UE 1, authentication-based information.

Preferably, the requester is configured to inform the requested service that the multi-connectivity termination point 33 is allowed to request the authentication information on behalf of the UE 1, or the service provider 4 is requested transparently from the multi-connectivity termination point 33 mimicking the UE 1. To mimic the UE 1, the multi-connectivity termination point 33 re-uses access specific authentication schemes and/or user plane (UP) or control plane (CP) protocols.

Preferably, the service provider 4 redirects the response through the multi-connectivity termination point 33 or is advised to use a direct communication path, bypassing the multi-connectivity termination point 33.

In FIG. 3, the multi-connectivity termination point 33 requests a particular service to the service provider 4 on behalf of the UE 1, while the UE 1 itself is connected over the Wi-Fi multipath 22, 32 but not over the cellular multipath 21, 31. The response is preferably transmitted end-to-end or as depicted in FIG. 3 sent to the multi-connectivity termination point 33 first and then forwarded to the UE 1.

In step S11, of FIG. 3, the UE requests service information associated with the cellular access network from the service provider 4 over Wi-Fi and the multi-connectivity termination point 33.

Similar to FIG. 2, if the multi-connectivity termination point 33 is in charge of the relevant authentication information beforehand, step S1a and S1b are not performed. Alternatively, if the multi-connectivity termination point 33 is not in charge of the relevant access specific information (such as, for example, authentication information) beforehand, in step S1a, the multi-connectivity termination point 33 requests for the relevant access specific information from the UE 1 or the mobile core 31. In step S1b, the mobile core 31 or the UE 1 sends a response with the access specific information to the multi-connectivity termination point 33.

In step S21, multi-connectivity termination point 33 sends the UE's request plus access specific information of the UE to the service provider 4, on behalf of the UE.

In step S22, the service provider 4 sends a response to multi-connectivity termination point 33. The response comprises the requested service information corresponding to the UE 1.

In step 531, the multi-connectivity termination point 33 forwards the received response from service provider 4 to the UE 1.

FIG. 4 illustrates an extended access eligibility requested over authorized access.

In step S100, the UE 1 informs the service provider 4, over the eligible access (cellular) that other accesses are eligible as well. In this step, the multi-connectivity termination point may not be necessarily involved. In other words, the UE 1 informs/requests the service 4 about alternative eligible access path(s).

In step S200, the service provider 4 sends a message to the UE 1 comprising authentication information such as, for example, a token, to be used by the new eligible access.

In step S300, the UE 1 uses the new eligible access (Wi-Fi), and sends a request message to the service provider 4 requesting cellular service information. The request message also comprises the authentication information or token received in step S200.

In step S400, the service provider 4 sends a message to the UE 1 comprising cellular service information.

Preferably, the above approaches of FIGS. 3 and 4 requires an additional authentication mechanism to verify the eligibility of the multi-connectivity termination point. For example, in FIGS. 3 and 4, the UE 1 or the mobile core 31 may be configured to notify about the eligibility of the multi-connectivity termination point 33 to the service provider.

Optionally, the above notification also instructs the service provider 4 to redirect all future communications through the multi-connectivity termination point 33.

Preferably, the multi-connectivity termination point is configured to imitate the characteristic of an individual access, e.g. its user and/or control plane.

Preferably, the multi-connectivity termination point 33, which may be the ATSSS UPF, requests from the UE and/or its accesses specific information required to authenticate at the requested service.

Preferably, the multi-connectivity termination point is configured to maintain a list of services which require access specific information. More preferably, this list also contains the expected access, the type of information and the method of exposing the information. The method of exposing the information may comprise the format and/or application programming interface (API), e.g. REST or a specific CP protocol, of the information.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made by those of ordinary skill within the scope of the following claims, which may include any combination of features from different embodiments described above. In particular, the present invention may cover further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

Furthermore, in the claims the word "comprising" does not exclude other elements or steps. A single unit may fulfill the functions of several features recited in the claims. The terms "essentially", "about", "approximately" and the like in connection with an attribute or a value particularly also define exactly the attribute or exactly the value, respectively. Any reference signs in the claims should not be construed as limiting the scope.

The invention claimed is:

1. A system, comprising:
   a user equipment (UE);
   a multi-connectivity (MC) termination point; and
   a service provider;
   wherein the UE is connectable to the MC termination point through a first MC path and a second MC path, wherein the first MC path comprises a first access network and the second MC path comprises a second access network;
   wherein the UE is configured to send, to the service provider, via the second MC path and the MC termination point, a request for service information associated with the first access network;
   wherein the MC termination point is configured to send, to the service provider, the request and access specific information on behalf of the UE, wherein the access specific information comprises authentication information that allows the MC termination point to access the service on behalf of the UE;

wherein the service provider is configured to send, to the MC termination point, the service information associated with the first access network;

wherein the first access network comprises a radio access network (RAN) and a mobile core, and the second access network comprises a Wi-Fi access point (AP) and a fixed core; and wherein the MC termination point is further configured to:
based on the MC termination point not having the access specific information, request the access specific information from the UE or the fixed core; and
receive the requested access specific information from the UE or the fixed core.

2. The system of claim 1, wherein the access specific information further comprises tariff-based information.

3. The system of claim 1, wherein the UE requesting the service information associated with the first access network is based on the UE being connected to the MC termination point only through the second MC path;
wherein the MC termination point sending the access specific information to the service provider on behalf of the UE is also based on the UE being connected to the MC termination point only through the second MC path; and
wherein the service provider is further configured to, based on the UE being connected to the MC termination point only through the second MC path, send the service information associated with the first access network to the UE via the MC termination point and the second MC path.

4. The system of claim 3, wherein the UE or the first access network is configured to inform the service provider that the MC termination point is allowed to request from the service provider service information on behalf of the UE.

5. The system of claim 3, wherein the UE or the first access network is configured to instruct the service provider to redirect a response to the UE through the MC termination point.

6. The system of claim 1, wherein the MC termination point is an Access Traffic Steering, Switching and Splitting User Plane Function (ATSSS UPF).

7. The system of claim 1, wherein the access specific information comprises a Mobile Station International Subscriber Directory Number (MSISDN) and/or an International Mobile Subscriber Identity (IMSI).

8. The system of claim 1, wherein the MC termination point is configured to imitate a characteristic of the first access network.

9. The system of claim 1, wherein the MC termination point is configured to maintain a list of services which require access specific information.

10. The system of claim 9, wherein the list of services comprises at least one of: expected access information, type of information, or a method for exposing authentication information.

11. The system of claim 1, wherein:
the UE or the first access network is configured to inform the service provider that the second access network is an eligible access for providing access specific information on behalf of the UE;
the service provider is configured to send a message to the UE over the first access network, the message comprising authentication information to be used by the second access network;
the UE is configured to send a request message to the service provider, through the second access network, requesting service information, wherein the request message comprises the authentication information received from the service provider; and
the service provider is configured to send a message to the UE comprising the requested service information.

12. The system of claim 11, wherein the UE or the first access network is configured to instruct the service provider to redirect all future communications through the MC termination point.

13. A method for reachability of services specific to a specific access network in a system, the method comprising:
sending, by a user equipment (UE) of the system to a service provider of the system via a second multi-connectivity (MC) path and an MC termination point of the system, a request for service information associated with a first access network;
sending, by the MC termination point to the service provider, the request and access specific information on behalf of the UE, wherein the UE is connectable to the MC termination point through a first MC path and the second MC path, wherein the first MC path comprises a first access network and the second MC path comprises a second access network, wherein the access specific information is authentication information that allows the MC termination point to access the service on behalf of the UE; and
sending, by the service provider to the MC termination point, the service information associated with the first access network;
wherein the first access network comprises a radio access network (RAN) and a mobile core, and the second access network comprises a Wi-Fi access point (AP) and a fixed core; and
wherein the method further comprises:
based on the MC termination point not having the access specific information, requesting, by the MC termination point, the access specific information from the UE or the fixed core; and
receiving, by the MC termination point, the requested access specific information from the UE or the fixed core.

14. The method of claim 13, wherein the access specific information further comprises tariff-based information.

15. The method of claim 13, further comprising:
informing, by the UE or the first access network, the service provider that the MC termination point is allowed to request from the service provider service information associated with the first access network on behalf of the UE.

16. The method of claim 13, further comprising:
instructing, by the UE or the first access network, the service provider to redirect a response to the UE through the MC termination point.

17. The method of claim 13, wherein the MC termination point is an Access Traffic Steering, Switching and Splitting User Plane Function (ATSSS UPF).

18. The method of claim 13, wherein the access specific information comprises at least one of: a Mobile Station International Subscriber Directory Number (MSISDN) or an International Mobile Subscriber Identity (IMSI).

19. The method of claim 13, further comprising:
imitating, by the MC termination point, a characteristic of the first access network.

20. The method of claim 13, further comprising:
maintaining, by the MC termination point, a list of services which require access specific information.

21. The method of claim 20, wherein the list of services comprises at least one of: expected access information, type of information, or a method for exposing authentication information.

22. The method of claim 13, further comprising:
informing, by the UE or the first access network, the service provider that the second access network is an eligible access for providing access specific information on behalf of the UE;
sending, by the service provider to the UE, over the first access network, a message comprising authentication information to be used by the second access network;
sending, by the UE to the service provider, through the second access network, a request message requesting service information, wherein the request message comprises the authentication information received from the service provider; and
sending, by the service provider to the UE, a message comprising the requested service information.

23. The method of claim 22, further comprising:
instructing, by the UE or the first access network, the service provider to redirect all future communications through the MC termination point.

* * * * *